(12) United States Patent
Schmidt

(10) Patent No.: US 11,039,508 B2
(45) Date of Patent: Jun. 15, 2021

(54) INDUCTION RANGE

(71) Applicant: Spring (U.S.A.) Corporation, Naperville, IL (US)

(72) Inventor: Denise Schmidt, Naperville, IL (US)

(73) Assignee: Spring (U.S.A.) Corporation, Naperville, IL (US)

( * ) Notice: Subject to any disclaimer, the term of this patent is extended or adjusted under 35 U.S.C. 154(b) by 189 days.

(21) Appl. No.: 15/984,025

(22) Filed: May 18, 2018

(65) Prior Publication Data

US 2018/0332998 A1 Nov. 22, 2018

Related U.S. Application Data

(60) Provisional application No. 62/508,598, filed on May 19, 2017.

(51) Int. Cl.
*H05B 6/12* (2006.01)
*H05B 6/36* (2006.01)
(Continued)

(52) U.S. Cl.
CPC .......... *H05B 6/1272* (2013.01); *H05B 6/065* (2013.01); *H05B 6/1209* (2013.01);
(Continued)

(58) Field of Classification Search
CPC .......... A47J 36/2483; F24C 7/00; F24C 7/06; F24C 7/067; F24C 7/082–083;
(Continued)

(56) References Cited

U.S. PATENT DOCUMENTS 5,376,774 A * 12/1994 McGaffigan ......... H05B 6/1245
219/624
5,866,884 A * 2/1999 Cornec ................. H05B 6/1281
219/622
(Continued)

FOREIGN PATENT DOCUMENTS

EP 2840867 A1 2/2015
EP 2931005 A1 10/2015
(Continued)

OTHER PUBLICATIONS

Translation of EP3021639 (Year: 2016).*
(Continued)

*Primary Examiner* — Matthew P Travers
(74) *Attorney, Agent, or Firm* — Banner & Witcoff, Ltd.

(57) ABSTRACT

An illustrative induction warming range capable of heating one or more multiple-sized servers and/or pots at any location on the range top using a plurality of preconfigured heating settings including low (145-155 F), low-med (156-165 F), med-high (166-175 F), and high (176-185 F). The illustrative induction warming range may be configured for automatically switch off 2 minutes after pans are removed. The induction warming range is compatible with all induction ready servers and pans and may include a durable, easy to clean tempered glass top. The illustrative warming range may be configured as a portable unit for countertop use, as a built-in unit for installation in a countertop or other surface, and/or the unit may be configured for both countertop or drop-in use.

20 Claims, 6 Drawing Sheets

(51) Int. Cl.
*H05B 6/06* (2006.01)
*A47J 36/24* (2006.01)

(52) U.S. Cl.
CPC ............. *H05B 6/1245* (2013.01); *H05B 6/36* (2013.01); *A47J 36/2483* (2013.01); *H05B 2213/03* (2013.01); *H05B 2213/05* (2013.01)

(58) Field of Classification Search
CPC ...... F24C 7/087; F24C 15/102; F24C 15/104; H05B 6/062; H05B 6/065; H05B 6/12–1209; H05B 6/1245; H05B 6/1272; H05B 2213/03; H05B 2213/05
See application file for complete search history.

(56) References Cited

U.S. PATENT DOCUMENTS

| | | |
|---|---|---|
| 6,614,006 B2 | 9/2003 | Pastore et al. |
| 6,930,287 B2 | 8/2005 | Gerola et al. |
| 7,759,616 B2 | 7/2010 | Gouardo et al. |
| 9,290,890 B2 | 3/2016 | Naylor |
| 9,402,284 B1 | 7/2016 | Brija |
| 9,534,793 B2 | 1/2017 | Bunuel Magdalena et al. |
| 2009/0008384 A1 | 1/2009 | Roux |
| 2010/0163548 A1* | 7/2010 | Cretors ................ H05B 6/12 219/620 |
| 2012/0024840 A1 | 2/2012 | Lee et al. |
| 2012/0294990 A1* | 11/2012 | Graber ................ H05B 6/105 426/231 |
| 2015/0028022 A1 | 1/2015 | Moon et al. |
| 2015/0245417 A1 | 8/2015 | Fattorini et al. |
| 2016/0150600 A1 | 5/2016 | Lomp et al. |
| 2016/0330799 A1 | 11/2016 | Leyh et al. |
| 2018/0025838 A1* | 1/2018 | Som ................ H02J 50/10 361/143 |
| 2019/0254125 A1* | 8/2019 | Milanesi ................ H05B 6/065 |

FOREIGN PATENT DOCUMENTS

| | | | |
|---|---|---|---|
| EP | 3021639 | A1 | 5/2016 |
| EP | 2664216 | B1 | 8/2016 |
| FR | 2984463 | A1 | 6/2013 |
| WO | 2014108521 | A1 | 7/2014 |
| WO | 2015015373 | A1 | 2/2015 |

OTHER PUBLICATIONS

Translation of FR2984463 (Year: 2013).*
ABK IC10401 i-Cooking Induction Hob to fit directly into the worktop, May 9, 2017, 3 pgs.
Anywhere Induction System, Bon Chef, The Art of Food Presentation, Food Service Equipment, May 9, 2017, 2 pgs.
ACM 938 (77 CM)—Built in Hobs Built in Appliances—Whirlpool India, https://www.whirlpoolindia.com, May 9, 2017, 4 pgs.
Induction cooktops, Bosch, http://www.bosh-home.com.au/productlist/cooking-baking/cooktops/inductions-cooktops, May 9, 2017, 7 pgs.
Flex Induction, Siemens, http://www.siemens-home.bsh-group.com/au/flexinduction, May 9, 2017, 4 pgs.
36 inch Masterpiece Series Freedom Induction Cooktop CIT36XKBB, Thermador, http://www.thermador.com/cooking/cooktops/cit36xkbb-36-inch-masterpiece-series-freedom-induction-cooktop, May 9, 2017, 2 pgs.
Q700 80 cm Induction cooktop. Siemens, http://www.siemens-home.bsh-group.com/au/productlist/cooking/cooktops/Induction/EH875KU12E#tab+section-technicalspecs, May 9, 2017, 3 pgs.
Full surface induction cooktop CX 480 111, Gaggenau, http://www.gaggenau.com/gb/product/CX480/variation/CX480111#close, May 9, 2017, 5 pgs.
Mirage Buffet Induction Warmers, Vollrath, www.vollrath.com, May 10, 2017, 5 pgs.
The SMART Induction Warmer uses as little as 100 watts!, SMART Buffet Ware, https://smartbuffetware.com/products/tem/1AIW110V, May 10, 2017, 1 pgs.
Incogneeto Induction Warmer, Viking Professional, vikingrange.com, May 10, 2017, 2 pgs.
Max Induction, Built-In (Hold-Only) Induction Warmer, Spring USA, www.springsusa.com, Mar. 2011, 2 pgs.
Siemens full-surface induction cooktop lets you arrange the pans whereever you like, https://newatlas.com/siemens-full-surface-induction-cooktop/22236/, May 5, 2017, 5 pgs.
Siemens flexinduction Cooktops, http://www.siemens-home.bsh-group.com/au/flexinduction, May 5, 2017, 6 pgs.
Vollrath Mirage Buffet Induction Warmers—WebstaurantStore TV Video, https://www.webstaurantstore.com/video-3229/vollrath-mirage-buffet-induction-warmers, May 21, 2018, pp. 2.

\* cited by examiner

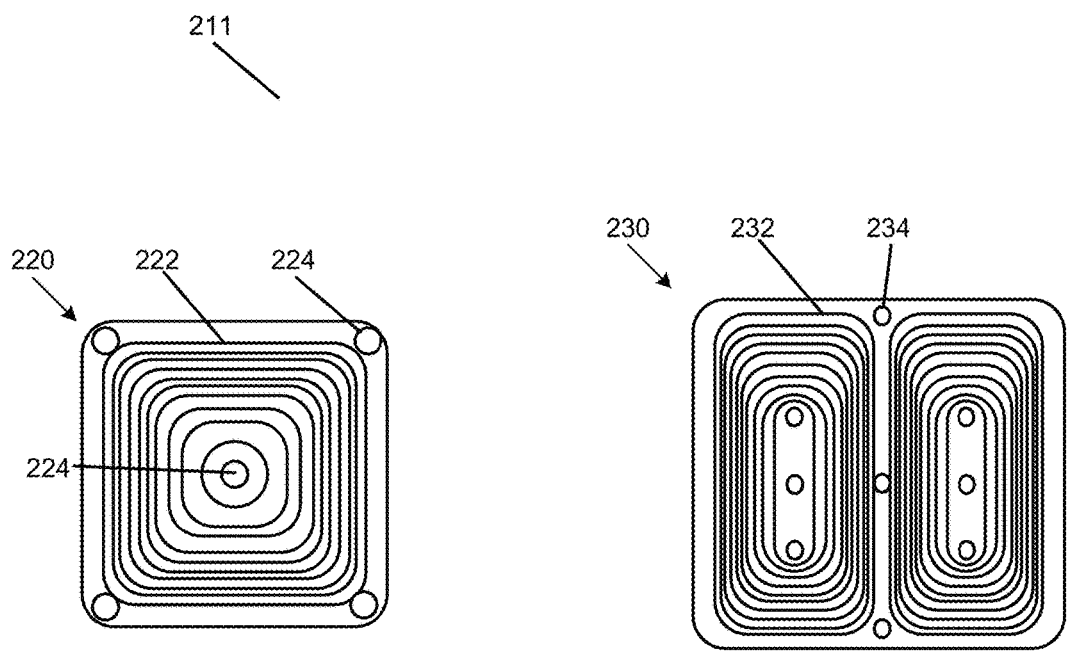
FIG. 2B  FIG. 2C
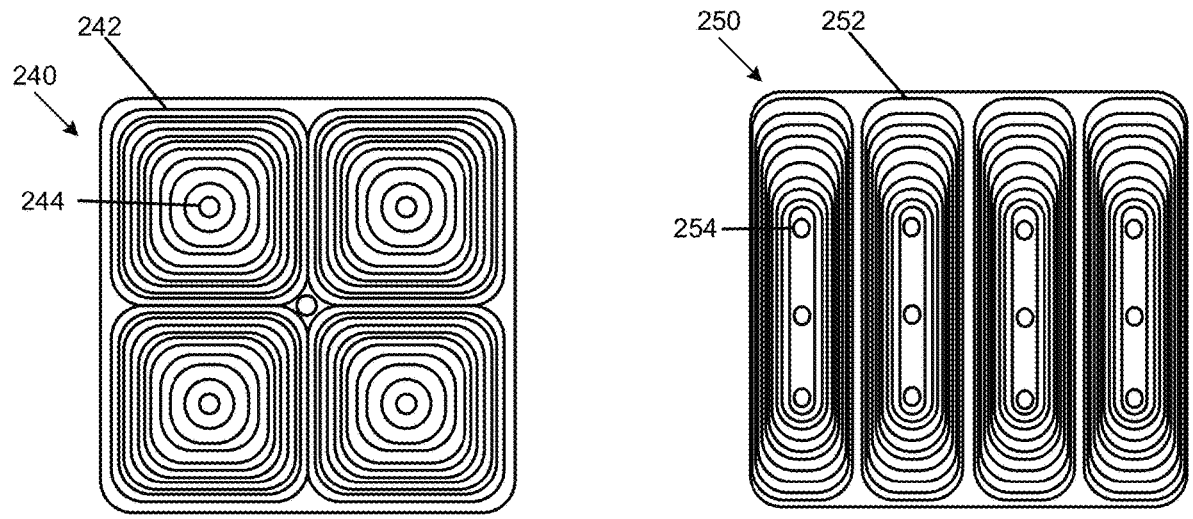
FIG. 2D  FIG. 2E

INDUCTION RANGE

CROSS-REFERENCE TO RELATED APPLICATION(S)

This application claims priority to provisional Patent Application No. 62/508,598 entitled "Induction Range" and filed on May 19, 2017, which is incorporated by reference in its entirety.

BACKGROUND

While induction warming ranges are generally more expensive than electric cooktops, induction warming ranges are becoming more popular because of their higher efficiency and the safety features associated with them. They come in various models and configurations, including countertop and built-in models that may be packaged in dual or single warmer configurations. As the name implies, countertop models are used while sitting on top of a counter while built-in models are generally dropped into a countertop before use.

In general, induction ranges may be configured with a heating element positioned to heat a pot placed in a specific portion of the top surface of the induction range, often indicated with a shape (e.g., a circle, a square) inscribed or otherwise marked on the surface. This design limits the ability of the range heating the single pot when placed in the indicated area, even when additional surface area is available. Therefore, a need has been recognized for an induction warming range capable of warming one or more pots placed at any location on the warming surface.

SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of the present disclosure are directed to an induction warming range that may be used as either a countertop warming unit or as a built-in warming unit. The control box used to power the induction heating elements may be detached from the enclosure of the induction warming range.

Aspects of the present disclosure are directed to an induction warming range that may be used to heat one or more pots placed anywhere on the top surface of the range and may have the ability to read induction ready vessels placed anywhere on the surface.

Aspects of the present disclosure are directed to an induction warming range that may include one or more heating elements that may be capable of heating sensed vessels. The induction warming range may also include a number of sensors, such as temperature sensors, current sensors, voltage sensors and the like. The control box may be used for setting a heating temperature selected from a number of pre-specified temperature ranges. The induction warming range may include one or more built-in receptacles capable of daisy-chaining a number of ranges on a 20-amp circuit.

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

A more complete understanding of aspects of the present disclosure and the advantages thereof may be acquired by referring to the following description in consideration of the accompanying drawings, in which like reference numbers indicate like features, and wherein:

FIGS. 2A-2E show illustrative top down views of an induction warming range with the top surface removed exposing one or more heating elements and a plurality of sensors according to aspects of the present disclosure;

DETAILED DESCRIPTION

In the following description of the various embodiments, reference is made to the accompanying drawings, which form a part hereof, and in which is shown by way of illustration various embodiments in which the disclosure may be practiced. It is to be understood that other embodiments may be utilized and structural and functional modifications may be made.

In current induction heating units, induction ready vessels must be placed in a specific location on the range to be within the magnetic field and for the sensor to read the temperature of the vessel. This limits use of these induction heating ranges to specific applications, such as applications that limited in how properly warmed food can be displayed and/or how many vessels can be placed on a single range. As such, a need has been recognized for an induction warming range upon which a vessel can be placed anywhere on the surface of the range. Such a device will increase usage possibilities for these induction ranges and minimize limitations on displaying warmed food. Also, in some cases, multiple coils and/or sensors may be distributed across the device to allow heating over an entire surface of the range. This means multiple vessels can be placed on a single induction warming range at a time and at any place on the range.

Figure 1:
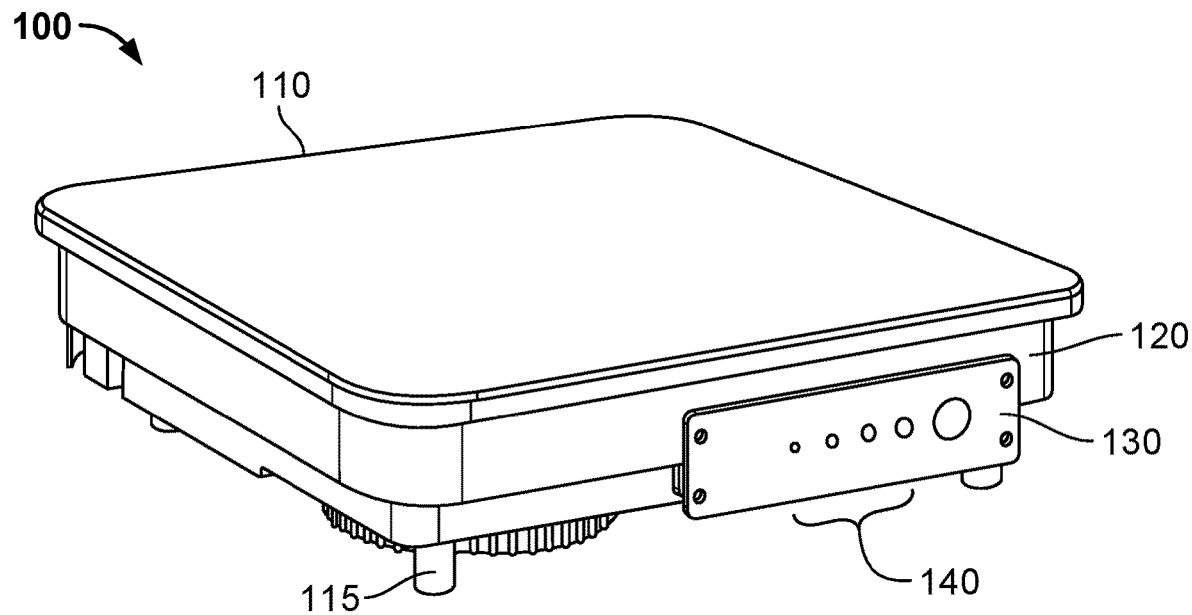
FIG. 1 illustrates an exterior view of an induction warming range capable of heating one or more vessels placed on its surface according to aspects of the present disclosure.

FIG. 1 illustrates an exterior view of an induction warming range 100 capable of heating one or more vessels placed on its surface 110 according to aspects of the present disclosure. The induction warming range 100, as shown in a stand-alone configuration, includes a substantially flat top surface 110, legs 115 to elevate the induction warming range enclosure 120 from a counter surface, and a control panel 130 to control the heating of one or more sensed vessels placed on the top surface. The illustrative induction warming range 100 is shown having a substantially square shape with dimensions of about 3.375" in height and about 14" in width and depth, but other shapes and dimensions are contemplated, including a rectangular heating surface shape, a circular heating surface shape, an oval heating surface shape, and/or the like. In some cases, the heating surface 110 may have a different shape than the enclosure 120.

Features of an illustrative induction warming range 100 may include the ability to daisy-chain a plurality of units into one 20 amp/120-volt circuit, such as by using an additional power receptacle (not shown) in the back of unit. In some cases, a power cord may be detachable from the induction warming range. In other cases, a power cord may be integral to the induction warming range. In some cases, one or more power receptacles may be installed in the enclosure 120, such that electric power may be supplied to the unit, such as via a male power receptacle, and/or electric power may be provided to one or more external devices (e.g., other induction warming ranges) via a detachable power cord and a female power receptacle. In some cases, one or more female power receptacles may be installed to provide an electric power output to an external device. The power cord may be provided in one or more predefined lengths and may include a male power connector on a first end and a female power connector on a second end. In some cases, a power cord may include a same connector (e.g., a male connector) on each end, such that power may supplied between different induction warming range units.

The illustrative induction warming range 100 may be capable of heating one or more multiple-sized servers and/or pots at any location on the range top using a plurality of preconfigured heating settings (e.g., one or more heat setting inputs 140) including a low (145-155 F) heat setting, a low-med (156-165 F) heat setting, a med-high (166-175 F) heat setting, and a high (176-185 F) heat setting. In some cases, the heat settings may be commanded by a user via one or more use inputs on the control panel 130. For example, the one or more heat setting inputs 140 may be provided on the control panel 130 to receive a user-supplied heat setting input. The one or more heat setting inputs 140 may include one or more input devices (e.g., a switch, a rotary input device, a multi-position switch, a digital input, to allow a user to select a desired heat setting. In some cases, the control panel 130 may include one or more output devices (e.g., light emitting diodes (LEDs), a digital display, etc.) to provide a visual indicator to the use of a selected heat setting, an indication that the induction warming range 100 is on, and/or the like.

The illustrative induction warming range 100 may be configured to automatically switch off after a predetermined duration (e.g., 1 minute after pans are removed, 2 minutes after pans are removed, etc.) as sensed by the induction warming range's built-in controller, discussed below. The induction warming range 100 may be compatible with all induction ready servers and pans and may include a durable, easy to clean tempered glass top. The illustrative warming range 100 may be configured as a portable unit for countertop use, as a built-in unit for installation in a countertop or other surface, and/or the unit may be configured for both countertop or drop-in use. No flame or radiant heat means a safer, cooler environment in which warmed food may be presented.

The top surface 110 of the induction warming range 100 may include a heating surface that may allow heating of vessels above the heating coil without heating other uncovered portions of the surface (e.g., a tempered glass surface, etc.). One or more vessels may be placed anywhere on the surface to be sensed for heating. The heating surface may include a finished edge portion of the tempered glass surface and/or other border material (e.g., a metal edge, a plastic edge, and/or the like). The heating surface may be without markings to indicate a particular location on the top surface for vessel placement. The heating surface, as shown in FIG. 1 may be a solid color, a pattern, or a combination of colors and/or patterns. In some cases, the finished edge portion may be raised from the top of the heating surface or may be flush with the top of the heating surface. In some cases, the finished edge portion of the top surface 110 may or may not include a beveled edge.

In some cases, the control panel 130 may be removable from the enclosure of the induction warming range 100 and may be attached to the enclosure 120 with one or more fasteners, including, but not limited to, screws, bolts, clips, and/or the like. The control panel 130 may include electronics to control an amount of heat provided by one or more induction heating elements. The control panel 130 may include an on/off button and one or more temperature setting inputs, such as the inputs 140. Additionally, the control panel 130 may also include a visual and/or graphical indication that the induction warming range 110 is turned on and/or heating one or more vessels placed on the surface. For example, the control panel may include an output portion including one or more visual indicators, such as an LED, a digital display, a liquid crystal display and/or the like. In some cases, the temperature setting inputs may include a plurality of individual pre-defined temperature settings. For example, the temperature settings may include 4 temperature settings: low (145-155 F), low-med (156-165 F), med-high (166-175), and high (176-185 F). In some cases, the temperature setting may be set to a specified temperature by a user, such as by using a variable temperature input or digital input device capable of receiving a specified temperature entry.

FIGS. 2A-2E show a top down views of an induction warming range 100 with the top surface 110 removed and exposing a of heating element (sometimes referred to as coils) and a plurality of sensors according to aspects of the present disclosure. In some cases, the heating element 210 may be formed of a single coil of wire. In some cases, the heating element may be formed into multiple sections, such as individual coils of the same wire. In some cases, the induction warming range 200 may include multiple individual heating elements each formed from a different wire, where one or more of these individual heating elements may be formed into a single section or multiple different sections. In the illustrative example of FIG. 2A, the induction warming range 200 includes a single heating element 210 comprising three individual coil shaped sections, each coil-shaped section is configured as a coil of wire capable of induction heating of vessels placed above the heating elements. In some cases, each coil-shaped section may be independently formed using a portion of the same wire. For example, the individual coils may be formed from a continuous conductive element, (e.g., a wire) from an input connection 211 to an output connection 215 at which electrical power may be applied to the heating coils 210. The induction warming range 200 may be rated for a specified power level (e.g., 100 watts, 200 watts, 300 watts etc.), a specified current level (e.g., 2.0 amps, 2.5 amps, 3.0 amps, etc.), and operation within a specified AC voltage range and frequency, such as the range of 110-120 volts at 50 or 60 Hertz, 215-245 volts at 50 or 60 Hertz, and the like. The induction warming range 200 may also provide at least one built-in receptacle for daisy-chaining a plurality of induction warming ranges together. In some cases, the receptacle may correspond to international power outlet standard, a wiring connector, a terminal block connector, and/or the like. For example, in a first configuration the induction warming range 200 may be capable of daisy chaining up to 5 induction ranges, and/or other devices, on a 20-amp circuit, such as by using a power cord including 14-gauge wire. In some cases, the induction warming range 200 may be capable of daisy-chaining more induction warming ranges (e.g., greater than 5) by incorporating a power cord having a larger-gauge wire (e.g., 12-gauge wire, 10-gauge wire, etc.) or fewer ranges by incorporating a cord having a smaller-gauge wire (e.g., 16-gauge, etc.).

Figure 2A:
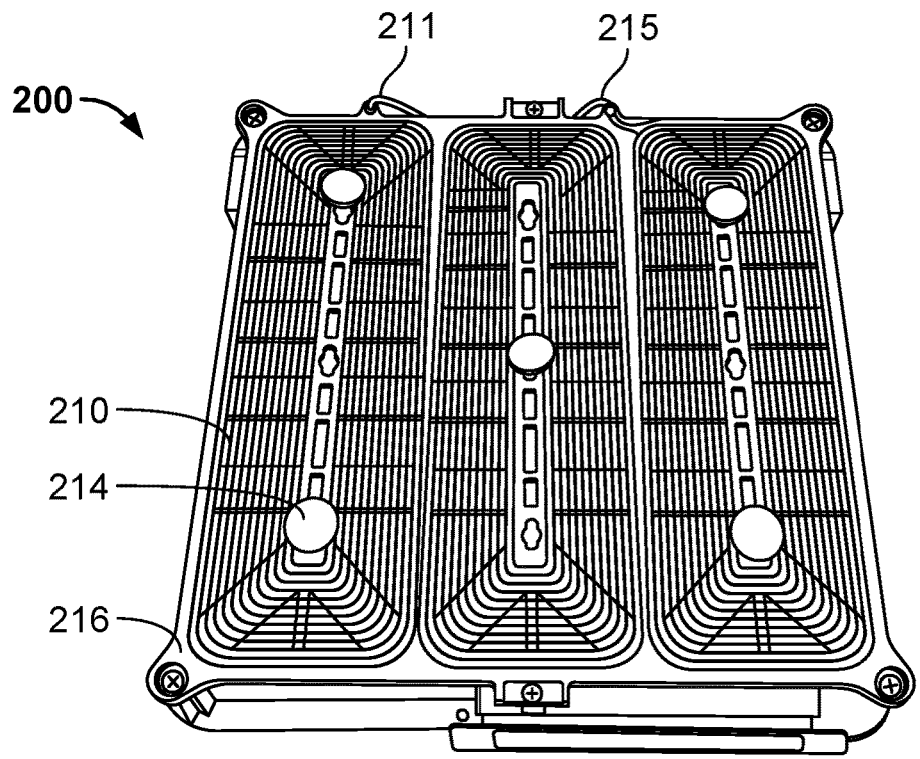

In the illustrative example of FIG. 2A, the induction warming range 200 includes a plurality of temperature sensors 214 (e.g., 5 temperature sensors) and three sections of the heating element 210. In some cases, the heating element 210 and/or portions thereof may be used as sensors, where feedback signals being used by the induction range controller to determine whether or not a vessel is placed on the range surface. For example, a current and/or voltage value associated with individual coils may be used to determine placement, size and/or shape of the one or more vessels placed on the surface of the induction warming range. In some cases, the sections of the heating element 210 may be shaped as an oval or rounded-rectangular shape, as shown, or may be formed into other shapes (e.g., a square, circle, rectangle, hexagon, and the like). In the illustrative example of FIG. 2A, the sections of the heating element 210 may be configured as 18 strand×36 loop, with 0.3 mm diameter wire and may have an inductance of approximately L=90 uH±5. The heating sensors 214 may be one or more different temperature sensors including a PTC type sensor, an NTC type sensor, a thermistor, and/or the like. In the illustrative example, the temperature sensors may be an NTC type sensor having a rating of 100 K±2%.

In the illustrative example of FIG. 2A, the three sections of the heating element 210 may be evenly distributed beneath the heating surface (e.g., heating surface 110), such that the majority of the heating surface is capable of heating vessels placed on the surface. The heating element 210 may be supported beneath the heating surface 110 by a structure 216 that may have at least some characteristics of a thermal insulator. In some cases, at least a portion of the structure 216 may be made of a thermal insulating material such as ceramic. While the illustrative coil distribution pattern is shown as three coils located side-by-side along the width of the induction warming range and extending approximately the effective length of the interior portion of the induction warming range enclosure. In some cases, other distribution patters for coil placement may be contemplated, such as a grid-pattern, and the like. As shown in FIG. 2A, the temperature sensors may be distributed to sense a temperature of at least a zone of the heating surface, such as to determine a heat applied to a portion of the surface holding a vessel placed on top. In some cases, the temperature sensors 214 may be used as an input into an algorithm for controlling an amount of heating energy provide by the heating element coils 210 and/or for determining a size and/or shape of the vessel(s) being heated. In some cases, one or more other sensors may be used, such as current sensors, pressure sensors, and the like. Such sensors may be placed beneath the heating surface 110, or at another location within the enclosure 120.

While FIGS. 2B-2E show other illustrative coil arrangements for use in an induction warming range according to aspects of this disclosure, other coil shapes and/or arrangements of sensors are also be contemplated. In some cases, the coil arrangements shown in FIGS. 2B-2E may be individual heating elements, portions of a same heating element or combinations of different heating elements and portions of a same heating element. FIG. 2B shows an illustrative induction warming range 220 having a single heating element coil 222 shaped as a rounded rectangle and a plurality of sensors (e.g., temperature sensors) 224 disposed underneath the heating surface. FIG. 2C shows an illustrative induction warming range 230 having two heating element coils 232 shaped as elongated rounded rectangles and a plurality of sensors (e.g., temperature sensors) 234 disposed underneath the heating surface. FIG. 2D shows an illustrative induction warming range 240 having four heating element coils 242 shaped as rounded rectangles and a plurality of sensors (e.g., temperature sensors) 244 disposed underneath the heating surface. FIG. 2E shows an illustrative induction warming range 250 having four heating element coils 252 shaped as elongated rounded rectangles and a plurality of sensors (e.g., temperature sensors) 254 disposed underneath the heating surface.

Figure 3:
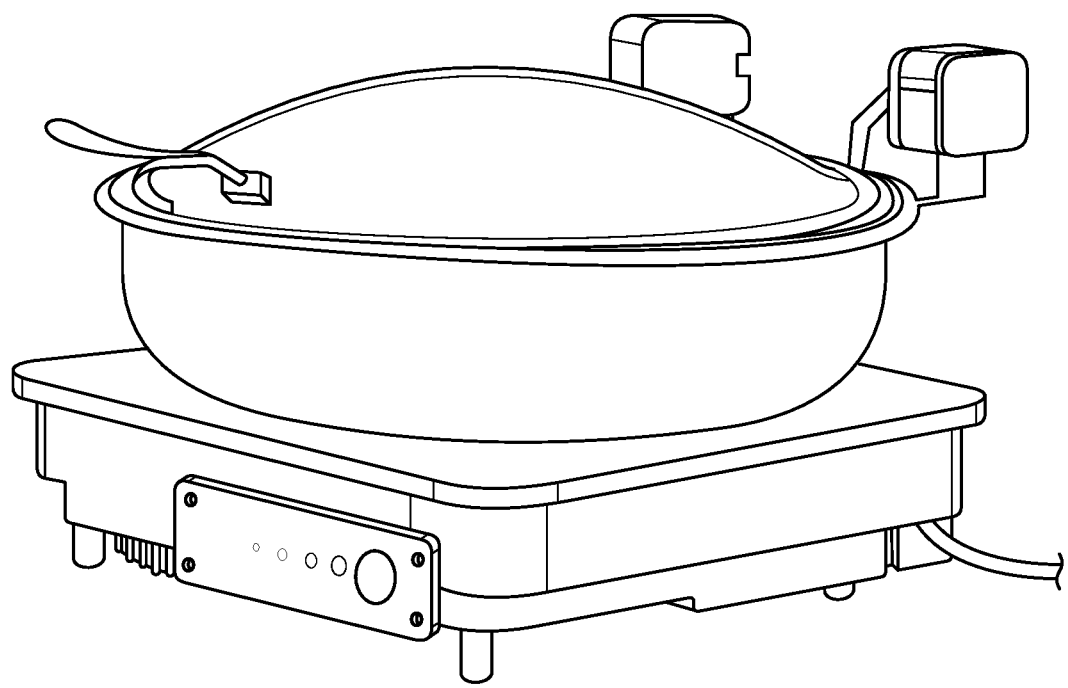
FIGS. 3 and 4 show an induction warming range heating a single vessel according to aspects of the present disclosure.
Figure 4:
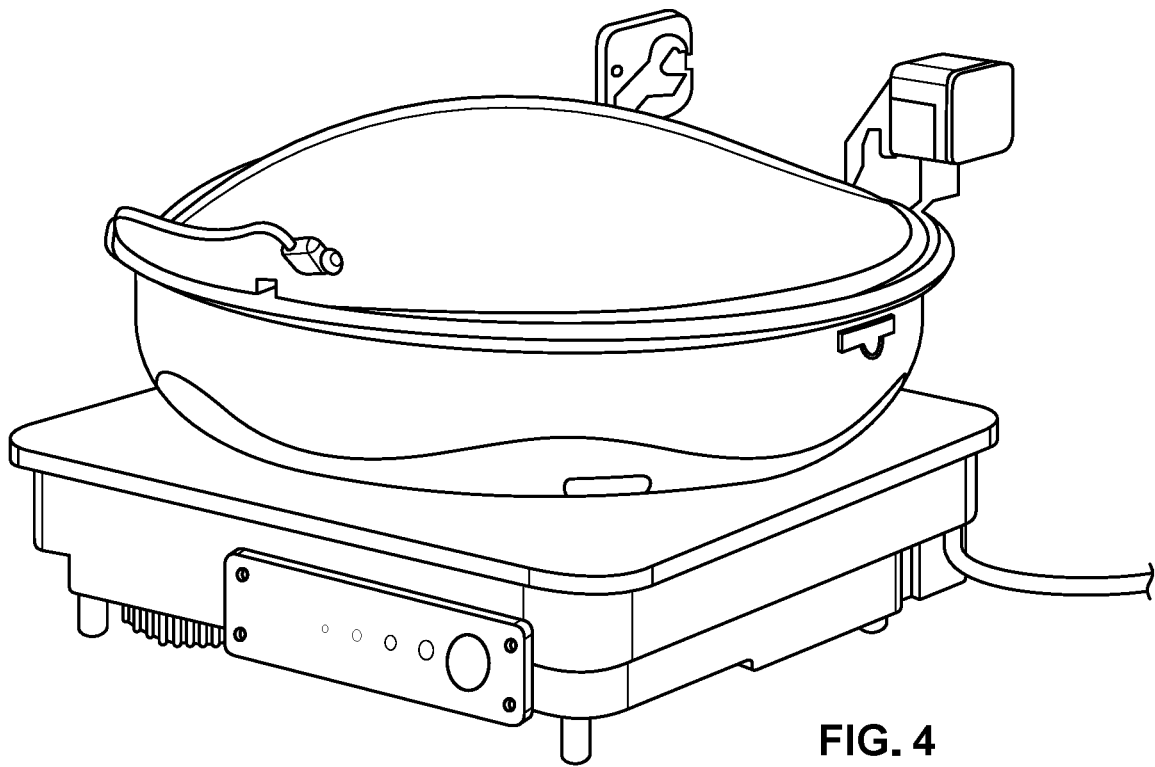
Figure 5:
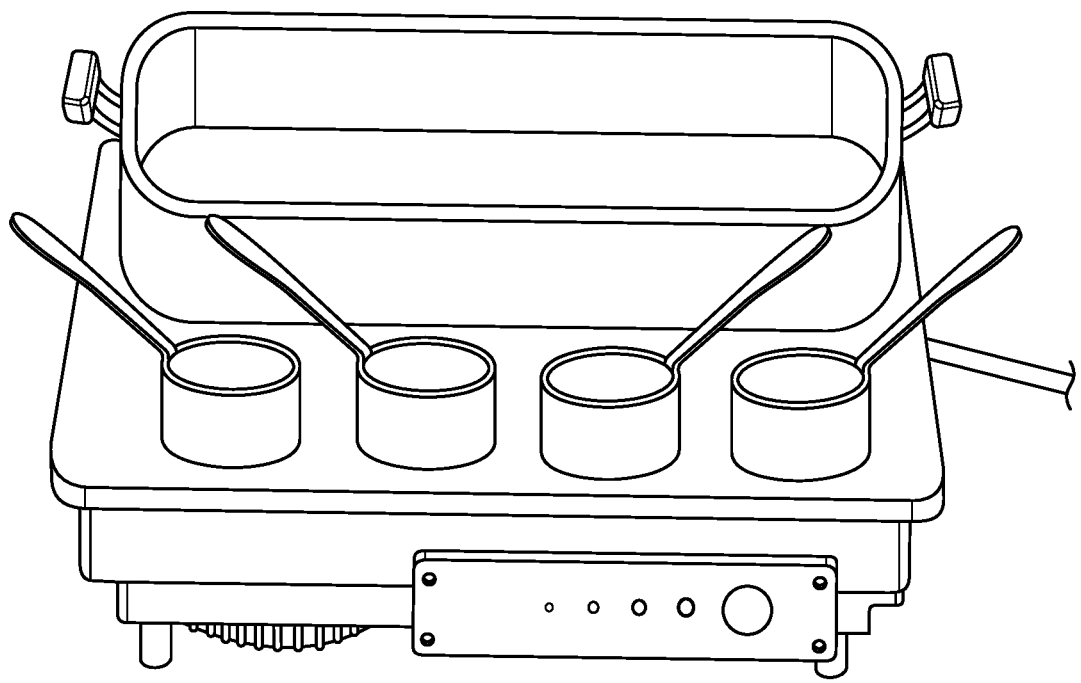
FIGS. 5 and 6 show an induction warming range heating a plurality of vessels dispersed on the surface of the range according to aspects of the present disclosure.
Figure 6:
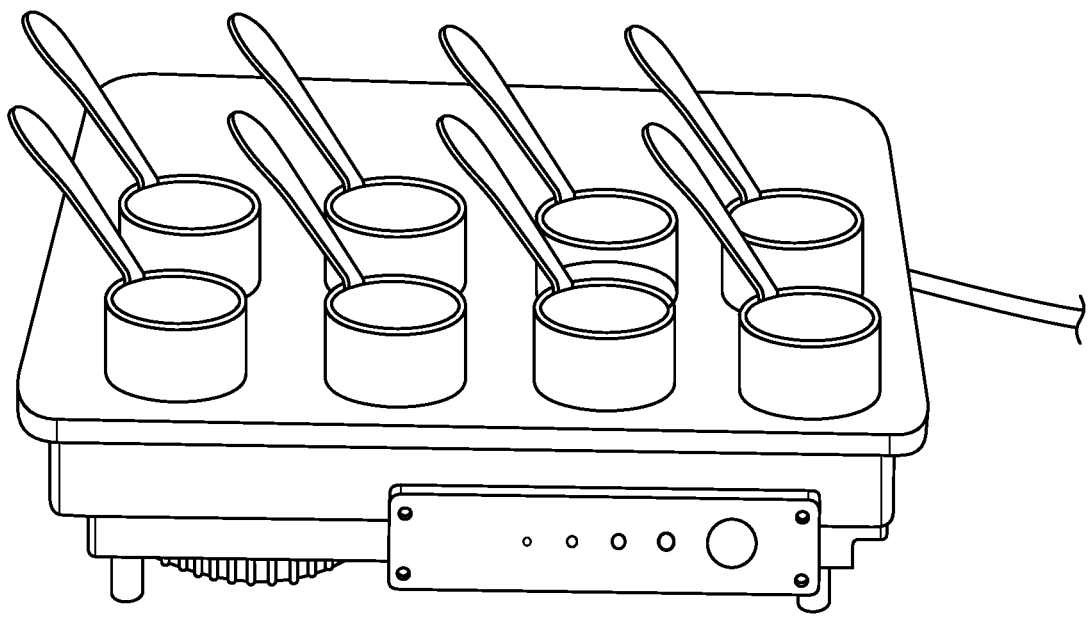

FIGS. 3 and 4 show an induction warming range heating a single vessel according to aspects of the present disclosure. FIGS. 5 and 6 show an induction warming range heating a plurality of vessels dispersed on the surface of the range according to aspects of the present disclosure. As can be seen, the illustrative induction warming range may be capable of heating a single vessel or multiple different sized vessels. In some cases, the induction warming range may be capable of sensing a location of any sized vessel or vessels placed upon the heating surface. In some cases, the induction warming range may be capable of sensing a vessel or a plurality of vessels having at least a minimum surface area, a minimum linear geometric dimension (e.g., a diameter, a side, and the like). In an illustrative example, a minimum dimension of a pot may be a linear geometric dimension of about 5 centimeters, 10 centimeters, 12 centimeters, 15 centimeters, and the like.

Figure 7:
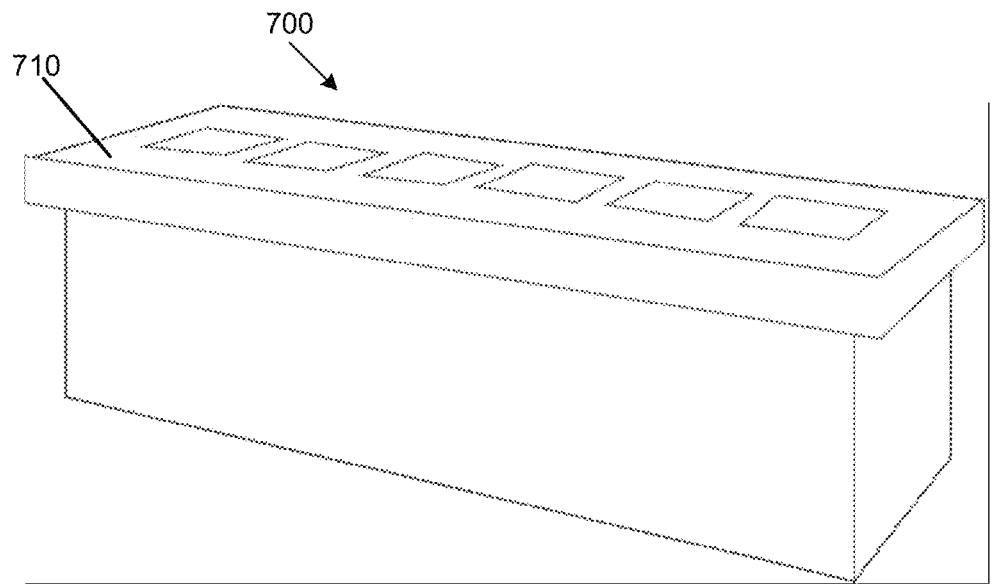
FIGS. 7 and 8 show line drawings illustrating a plurality of induction warming ranges in a built-in installation according to aspects of the present disclosure.
Figure 8:
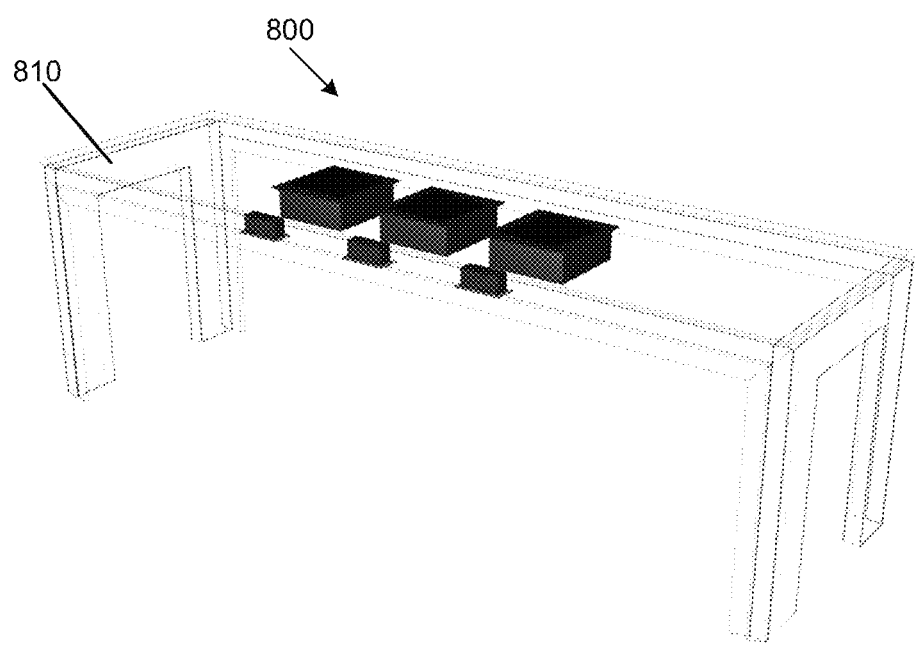

FIGS. 7 and 8 show line drawings illustrating a plurality of induction warming ranges 700, 800 in a built-in installation 710 and 810 according to aspects of the present disclosure. As discussed above, the induction warming ranges 700 and 800 may be configured to be built-in, such as to be dropped into a countertop surface. In some cases, the induction warming ranges 700 and 800 may be configured to be mounted flush to the countertop surface. In some cases, the surface of the induction warming range may be configured to be above (e.g., about ⅛ inch, about ¼ inch) the surface of the countertop. In some cases, a plurality of induction warming ranges 700 and 800 may be distributed along the surface of the counter. In such cases, a minimum spacing between units may be required, such as a spacing of several inches (e.g., about 1 inch, about 2 inches, etc.). In some cases, the induction warming ranges 700 and 800 may be designed such that heating surfaces of different induction warming ranges may be substantially adjacent to each other. To facilitate the use of the induction warming range as both a countertop and built-in unit, a ledge may be incorporated into the enclosure and may be prominent enough to act as a stop as it is dropped into a countertop. Such a ledge may also not be so prominent as to interfere with the use of each of the induction warming range 700 an d800 as a countertop unit. In some cases, the control panels for each installed induction warming range may be located adjacent or near to the associated heating surface.

Figure 9:
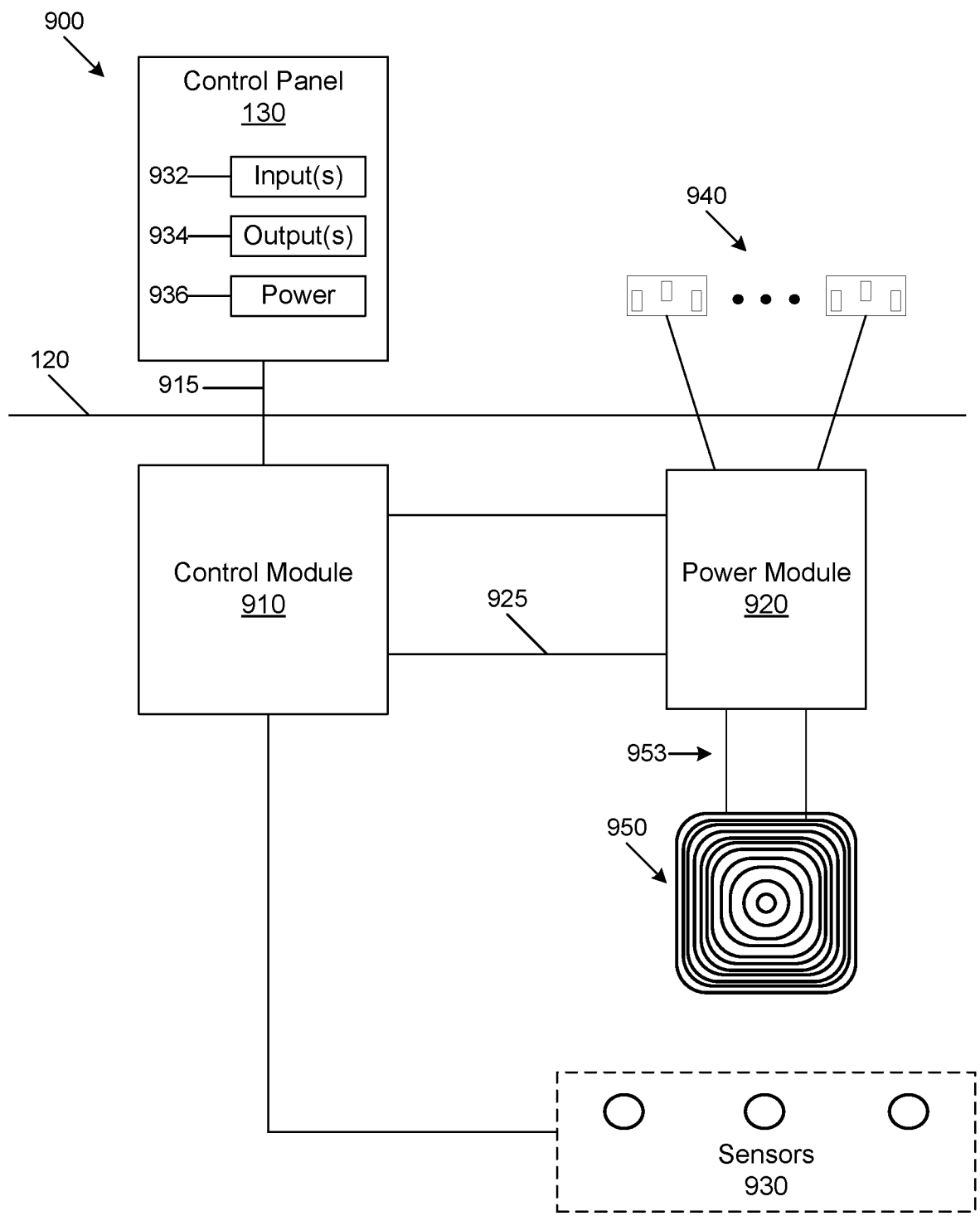
FIG. 9 shows a line drawing showing an illustrative block diagram of an induction warming range according to aspects of the present disclosure.

FIG. 9 shows a line drawing of a block diagram of an illustrative induction warming range 900 according to aspects of this disclosure. The induction warming range 900 may include the control panel 130 and one or more power receptacles 940 accessible to a user at the exterior of the enclosure 120. The control panel 130 may be electrically connected to the control module 910 via an electrical interface 915. The control panel 130 may include one or more inputs 932, one or more outputs 934, and a power switch 936. In some cases, the inputs 932 and the outputs 934 may be integrated into common components (e.g., a switch and a visual indicator such as an LED, a digital display screen and the like) or may be separate components. The control module 910 may include a processor (e.g., a microprocessor, an application specific integrated circuit (ASIC), a digital signal processor (DSP), etc.) and a memory device storing instructions that, when executed by the processor, cause the induction warming range 900 to sense a vessel placed on the heating surface 110 based on information sensed via the coil 950 and/or the sensors 930. The sensors 930 may include thermal sensors, voltage sensors, current sensors, and/or other such devices capable of sensing electrical and/or heat energy supplied to and/or by the coil 950. The one or more power receptacles 940 may be capable of accepting a power cord to supply electrical energy to the induction warming range 900 via a first power receptacle and/or to additional induction warming ranges, or other devices, electrically coupled to a second power receptacle. In some cases, a power cord may be physically detachable from the power receptacles 940. In some cases, the power cord may be physically integrated into the induction warming range, while one or more of the power receptacles 940 may be used to provide power to external devices.

In some cases, the power receptacles 940 may be electrically connected to a power module 920. The power module 920 may receive AC power from one of the power receptacles 940 (or a separately connected electrical power cord) and may provide electrical energy to one or more external devices via a different power receptacle. The power module may include a voltage converter that may convert AC power into a DC voltage (e.g., 3 volts, 5 volts, etc.) to provide power to the control module 910 and/or the control panel 130. The power module 920 may be controlled via one or more control lines 925 by the control module 910 to provide electrical energy to the one or more coils 950 via the power connection 953.

In some cases, a user may turn the induction warming range on via the power input 936. The user may also specify, via an input 932 (e.g., a switch), a temperature or temperature range to heat a vessel placed on the surface of the induction warming range 900. The control module 910 may provide a visual indication of the heat setting to the user via the outputs 934 (e.g., an LED). Once activated, the control module may provide a control signal to the power module 920 to provide a specified amount of electrical energy to the one or more coils 950, generating a current through the one or more coils. The control module 910 may monitor the current through the coils via a current sensing and/or a voltage sensing circuit. The control module 910 may analyze the current value from the current sensing circuit and/or the voltage value from the voltage sensing circuit to identify whether a vessel has been placed on the heating surface 110. In some cases, a low current value may indicate that no vessel has been placed on the surface and after a duration, the control module 910 may instruct the power module 920 to reduce power or no longer supply power to the one or more coils. If the control module 910 senses a current meeting a predetermined threshold, the control module 910 may identify that an induction heating capable vessel has been placed on the heating surface 110 and send a command to the power module 920 to increase power applied to one or more of the coils 950. The control module then may monitor the current and/or signals received from the sensors (e.g., thermistors) to control the coils to heat the vessel to the commanded heat setpoint.

In some cases, one or more additional sensors may also be used to identify whether a vessel has been placed on the heating surface 110, such as a heat sensor (e.g., a thermistor), a pressure sensor (e.g., sensing a weight applied to the heating surface) and/or the like. In some cases, if an induction incompatible vessel is placed on the heating surface, a signal received from the pressure sensor may be compared to a predetermined weight threshold, by the control module 910 to issue an error if the weight threshold has been met without a heat threshold and/or a current threshold also being met.

While illustrative apparatuses and methods as described herein embodying various aspects of the present disclosure are shown, it will be understood by those skilled in the art, that the disclosure is not limited to these embodiments. Modifications may be made by those skilled in the art, particularly in light of the foregoing teachings. For example, each of the elements of the aforementioned embodiments may be utilized alone or in combination or subcombination with elements of the other embodiments. It will also be appreciated and understood that modifications may be made without departing from the true spirit and scope of the present disclosure. The description is thus to be regarded as illustrative instead of restrictive on the present disclosure.

The invention claimed is:

1. An induction warming range comprising:
a top surface for concurrent placement of a plurality of induction-ready vessels, wherein a heating surface comprises substantially all of the top surface;
a control unit comprising a controller processing instructions to control heating of the plurality of induction-ready vessels when placed anywhere on the heating surface, wherein the control unit senses a location of one or more of the plurality of induction-ready vessels placed on the top surface; and
a heating element comprising a plurality of non-concentric individual coil shaped sections distributed evenly beneath and defining the heating surface to heat each of the plurality of induction-ready vessels, wherein the plurality of non-concentric individual coil shaped sections of the heating element are formed from a same continuous conductive element and wherein the control unit controls induction heating of the induction-ready vessels based on a sensed current change identifying one or both of a first vessel placed at a first heating surface location adjacent to a first portion of the heating element and a second vessel placed at a second heating surface location adjacent to a second portion of the heating element.

2. The induction warming range of claim 1, wherein the heating surface allows for heating of each of the plurality of induction-ready vessels at any location on the heating surface.

3. The induction warming range of claim 1, wherein the control unit includes a plurality of pre-defined heating set-points.

4. The induction warming range of claim 3, wherein the plurality of pre-defined heating set-points include a low temperature range, a low-medium temperature range, a high-medium temperature range, and a high temperature range.

5. The induction warming range of claim 3, wherein the plurality of pre-defined heating set-points include a low temperature range of 145 degrees F. to 155 degrees F., a low-medium temperature range of 156 degrees F. to 165 degrees F., a high-medium temperature range of 166 degrees F. to 175 degrees F., and a high temperature range of 176 degrees F. to 185 degrees F.

6. The induction warming range of claim 1, including an enclosure configuring the induction warming range as a stand-alone unit.

7. The induction warming range of claim 1, including an enclosure configuring the induction warming range as drop-in unit for installation in a surface.

8. The induction warming range of claim 1, including an enclosure configuring the induction warming range for either a stand-alone unit or a drop-in unit.

9. The induction warming range of claim 1, comprising a plurality of temperature sensors.

10. The induction warming range of claim 9, wherein each of the plurality of temperature sensors are configured to sense a temperature at a different location of the heating surface.

11. The induction warming range of claim 9, wherein each of the plurality of temperature sensors are negative temperature coefficient (NTC) type devices.

12. The induction warming range of claim 1, wherein each of the individual coil-shaped sections of the heating element are arranged as a rectangular coil and are positioned adjacent to each other and are positioned lengthwise from front to back of the induction warming range.

13. The induction warming range of claim 1, wherein the heating element comprises three coil-shaped sections each being positioned to heat an adjacent third of the heating surface.

14. The induction warming range of claim 1, wherein each of the coil-shaped sections comprises a coil configured as an 18 strand by 36 loop, with 0.3 mm wire.

15. The induction warming range of claim 1, wherein each of the coil-shaped sections comprises a coil having an inductance of 90 uH±5.

16. The induction warming range of claim 1, wherein the heating surface comprises tempered glass.

17. The induction warming range of claim 1, wherein at least two of the plurality of induction-ready vessels are of different sizes.

18. The induction warming range of claim 1, comprising a power receptacle to provide power to at least one additional device.

19. The induction warming range of claim 18, wherein the power receptacle provides power to up to five daisy-chained induction warming ranges.

20. The induction warming range of claim 18, wherein the power receptacle provides power to up to six or more daisy-chained induction warming ranges.

* * * * *